United States Patent [19]

Pohlmann et al.

[11] Patent Number: 4,812,434

[45] Date of Patent: Mar. 14, 1989

[54] EXHAUST GAS CATALYSTS AND PROCESS FOR THE PRODUCTION THEREOF

[75] Inventors: Hans-Jürgen Pohlmann; Klaus Strobel, both of Selb, Fed. Rep. of Germany

[73] Assignee: Hutschenreuther AG, Selb, Fed. Rep. of Germany

[21] Appl. No.: 169,107

[22] Filed: Mar. 9, 1988

Related U.S. Application Data

[63] Continuation of Ser. No. 767,859, Aug. 21, 1985, abandoned.

[30] Foreign Application Priority Data

Aug. 22, 1984 [DE] Fed. Rep. of Germany ....... 3430912

[51] Int. Cl.$^4$ ............................................. B01J 27/224
[52] U.S. Cl. ..................................................... 502/178
[58] Field of Search .................. 502/178, 179; 501/88, 501/90; 264/59, 63, 65

[56] References Cited

U.S. PATENT DOCUMENTS

| | | | |
|---|---|---|---|
| 2,424,085 | 7/1947 | Bergsteinsson et al. | 502/178 |
| 3,189,472 | 6/1965 | Taylor | 501/88 |
| 3,419,415 | 12/1968 | Dietrich | 501/90 X |
| 3,449,063 | 6/1969 | Griffing et al. | 423/213.5 |
| 3,867,312 | 2/1975 | Stephens | 502/439 X |
| 3,947,550 | 3/1976 | Fitchmun | 264/63 X |
| 4,124,401 | 11/1978 | Lee et al. | 501/90 |
| 4,174,971 | 11/1979 | Schrewelius | 501/88 |
| 4,195,049 | 3/1980 | Noaker et al. | 264/63 |
| 4,238,434 | 12/1980 | Enomoto et al. | 264/63 |
| 4,241,135 | 12/1980 | Lee et al. | 501/88 X |
| 4,318,876 | 3/1982 | Broussaud | 264/65 |
| 4,525,429 | 6/1985 | Kaiser et al. | 264/59 X |

FOREIGN PATENT DOCUMENTS

| | | | |
|---|---|---|---|
| 138061 | 10/1979 | German Democratic Rep. | 501/90 |
| 1109189A | 8/1984 | U.S.S.R. | 502/178 |

Primary Examiner—W. J. Shine
Attorney, Agent, or Firm—Felfe & Lynch

[57] ABSTRACT

The present invention provides an exhaust gas catalyst, wherein it consists of about 50 to about 95% by weight of silicon carbide and about 5 to about 50% by weight of an alloy of silicon with one or more metals of the group copper, iron, cobalt, nickel, chromium, vanadium, molybdenum, manganese, zinc, silver, platinum, palladium or other catalytically-active metals, the catalytically-active surface of which has optionally been activated by oxidation and/or chemical after-treatment.

The present invention also provides processes for the production of this catalyst.

12 Claims, No Drawings

EXHAUST GAS CATALYSTS AND PROCESS FOR THE PRODUCTION THEREOF

This is a continuation of application Ser. No. 767,859 filed on Aug. 21, 1985.

The present invention is concerned with an exhaust gas catalyst and with processes for the production thereof.

More particularly, the present invention is concerned with an exhaust gas catalyst which essentially consists of silicon carbide and an alloy of silicon with one or more metals of the group copper, iron cobalt, nickel, chromium, vanadium, molybdenum, manganese, zinc, silver, platinum, palladium or other catalytically-acting metals and the surface of which is activated by oxidation or chemical after-treatment, as well as with a process for the production of such a formed body of reaction sintering, infiltration and possibly subsequent oxidation or chemical activation.

The production of composite bodies from silicon carbide and silicon by infiltration of a raw body of silicon carbide and carbon with molten silicon is, in principle, known from Federal Republic of Germany Patent Specification No. 10 90 565. Also known is the use of aromatic resins as binding agent for such raw bodies and the carbonisation of these carbon-rich resins in the raw body from Federal Republic of Germany Patent Specification No. 26 44 503. According to the prior art, the silicon can be introduced from outside via the vapour phase or as melt into the reaction batch or, according to Federal Republic of Germany Patent Specification No. 16 71 092, can already be contained in the raw mixture.

Common to all known processes is the binding of the formed body by the secondary silicon carbide ($\beta$-SiC) resulting in the case of the reaction of the pure silicon with the free carbon present in the moulded body. Impurities of the silicon due to alloying components or other admixtures are, in the case of the known processes, undesired since their reaction products with carbon or oxygen frequently possess undesired properties, such as low temperature stability or low mechanical strength.

Additions to the fundamental composition, usually consisting of silicon carbide (SiC) and silicon (Si), are known from U.S. Pat. No. 3,189,472 in which an increase of the resistance to oxidation of silicon carbide work materials is described by the addition of preferably molybdenum and tantalum disilicide. The production of these oxidation-resistant bodies takes place in a calcination process which is carried out at temperatures of above 2100° C. but, as a rule, at 2300° C. and is usually connected with a recrystallisation process of the SiC phase. As additive materials, there are mentioned metals or their compounds of the group tungsten, chromium, iron, hafnium, tantalum, titanium, zirconium and molybdenum which are well known as temperature-resistant and oxidation-resistant metals.

In Federal Republic of Germany Patent Specification No. 26 56 072, there is described a formed body of silicon carbide which is also infiltrated with molybdenum disilicide ($MoSi_2$) for increasing the oxidation and temperature resistance. It contains an $MoSi_2$ alloy as pore filling with 30 to 80% by volume of silicon, the remainder being molybdenum.

A process for the production of infiltrated carbon by impregnation of porous carbon bodies with melts of metals or of their alloys at temperatures of up to 1400° C. in an autoclave is known from Federal Republic of Germany Patent Specification No. 21 65 111. There are there described carbon-metal composite bodies which are used as bearing materials for mechanically stressed components.

These known variations of SiC-metal composite bodies serve for influencing the mechanical and thermal properties of work materials and construction components which are used as bearings, heating elements in high temperature furnaces or as combustion adjuvants. From this state of the art, it would not be possible to deduce by simple consideration the production of the catalyst according to the present invention based on infiltrated SiC with the use of catalytically-active metals or metal alloys.

Exhaust gas catalysts with catalytically-active components, which are present in the work material of the formed body in homogeneous distribution, are known from Federal Republic of Germany Patent Specification Nos. 12 79 660; 17 15 993 and 20 58 264. These catalysts contain manganese, cobalt and copper oxide, as well as platinum or palladium in a matrix of magnesium aluminium silicate. However, such exhaust gas catalysts display considerable disadvantages which, in particular, are due to the low temperature and abrasion resistance and low chemical stability of the work materials used. The temperatures of use of these silicate carrier materials are limited to a maximum of 1200° C. and the limits for long-term stressing are considerably lower. Their low erosion stability leads, especially in the case of use in firing plant with dust formation, to a premature failing of the catalysts and thus to expensive replacements or repairs.

Great damage to the catalysts of known compositions also result due to chemical corrosion, not only by aggressive deposits but also by slag formation, especially when used in sulphur oxide-containing exhaust gases. Total failure of catalysts is observed especially when it is only a question of coated carrier bodies.

It is, therefore, an object of the present invention to provide an exhaust gas catalyst with improved mechanical, chemical and thermal properties which contains the catalytically-active components in finely divided distribution over the whole of the cross-section of the material. In particular, it is an object of the present invention partly or completely to overcome the disadvantages of the above-mentioned prior art, to make exhaust gas catalysts available more economically and/or to improve their long-term strength in operation.

Thus, according to the present invention, there is provided an exhaust gas catalyst which consists of a matrix with 50 to 95% by weight of silicon carbide, preferably with a particle distribution of from 0 to 250 $\mu$m. and more preferably of from 0 to 100 $\mu$m., in which are embedded 5 to 50% by weight of the total weight of alloys of silicon with one or more metals of the group copper, iron, cobalt, nickel, chromium, vanadium, molybdenum, manganese, zinc, silver, platinum, palladium or other catalytically-acting metals. If desired, this metal component is activated by oxidation or chemical after-treatment.

Starting from the known technical teachings for the production of reaction-bound or infiltrated silicon carbide which is produced and used as work material for mechanically or thermally highly stressed constructional parts according to the prior art, we have, surprisingly, found that in the case of the present of catalytically-active materials from the group copper, iron, cobalt, nickel, chromium, vanadium, molybdenum, manganese, zinc, silver, platinum, palladium and other catalytically-acting metals in the silicon carbide matrix, the body according to the present invention acts as catalyst, for example for the oxidation of carbon monoxide and the reduction of $NO_x$. This catalyst-active action is, according to the production of the catalyst according to the present invention, further strengthened when, during the course of the calcination process, by objective cooling of the metal melts present in the pores, the separating out of crystalline metal and metal carbide phases is promoted. Furthermore, by subsequent oxidation and chemical post-treatment, an additional effect is achieved which increases the catalytic action.

By combination of the known good mechanical and thermal properties of the silicon carbide bodies with the surprisingly found possibility of embedding the objective separating out of catalytically-active materials in a silicon carbide matrix, there is made possible the provision of the catalyst according to the present invention which, because of its substantially improved mechanical and thermal properties, makes possible a longer period of use under extreme conditions and thus offers considerable economic advantages in comparison with previously known catalysts. A further advantage of the catalyst according to the present invention is the fact that the catalytically-active substances are homogeneously distributed in the whole of the body so that, in the case of mechanical damage to the constructional part, new and active surfaces are continuously formed.

According to the present invention, the new catalyst is produced by mixing 50 to 95% by weight of silicon carbide with a particle distribution of from 0 to 250 μm. and preferably of from 0 to 100 μm., 0.5 to 20% by weight of carbon, 0.5 to 20% by weight of an aromatic resin and 0.5 to 49% by weight of a mixture or of an alloy of silicon with one or more catalytically-active metals of the group copper, iron, cobalt, nickel, chromium, vanadium, molybdenum, manganese, zinc, silver, platinum, palladium or other catalytically-active metals, forming the mixture and heating the formed body obtained to above the decomposition temperature of the aromatic resin in a non-oxidising atmosphere and thereafter calcining in a non-oxidising atmosphere or in a vacuum at 1350° to 2100° C. Carbides, preponderantly silicon carbide, are thereby formed which bring about a binding of the SiC grains and a metallic phase in which, by appropriate temperature control during the cooling phase, one or more crystalline phases are objectively separated out.

If desired, the silicon carbide of the crude mixture can be replaced wholly or partly by carbon, such as graphite, charcoal or coke.

According to a modification of the process according to the present invention, the resultant porous metal-SiC composite body is impregnated in a subsequent process, at a temperature of from about 1000° to about 2300° C., preferably of up to about 2100° C., with a metal melt which contains one or more of the said catalytically-active metals alone or in combination with silicon.

If desired, the metal phase is catalytically activated in a subsequent oxidising calcination or by chemical after-treatment with acids, lyes or salts.

According to a further modification of the process according to the present invention, a crude body of SiC, carbon and resin is produced in known manner, carbonised and infiltrated in an infiltration calcination in a non-oxidising atmosphere or in a vacuum with an alloy of silicon with one or more of the above-mentioned catalytically-active metals. By appropriate control of the temperature, the carbide formation and, in the cooling phase, the separating out of crystalline metallic phases, is influenced.

This process according to the present invention can be varied by producing a porous SiC body in known manner and siliconising it by infiltration with one or more of the above-mentioned catalytically-active metals. Depending upon the amount of metal melt available, there is produced a dense or porous body. If desired, this body is activated by oxidation or chemical after-treatment.

The production of the formed body takes place in known manner with ceramic or powder-metallurgical forming processes, such as dry pressing, isostatic pressing, extruding, injection moulding, paste casting or foil casting.

The important features of the present invention consist in the embedding of catalytically-active metal or metal oxides formed therefrom in a matrix of silicon carbide and in the selection, combination and separating out form of the metals or metal oxides within the hollow spaces of this matrix. Furthermore, by means of the production process, the infiltration technique with metals or alloys is bound up with the advantage that the catalytically-active substances are distributed homogeneously over the whole cross-section of the material and thus, in the case of erosion or flaking off, new and active surfaces are continuously exposed in the interior or the catalyst.

In comparison with the process described in U.S. Pat. No. 3,189,472 for the production of oxidation-resistant SiC bodies, the process according to the present invention for the production of catalysts has the considerable advantage of a lower calcination temperature of from 1350° to 2100° C., which means that it can be carried out with a greater saving of energy and more economically. The catalytic action of the composite body according to the present invention and its production by reaction sintering, objective cooling and, if desired, oxidation and chemical activation of its surface can furthermore not be obviously derived from the technical teachings of U.S. Pat. No. 3,189,472.

The special advantage of the process according to the present invention in comparison with the known processes for the production of catalysts consists, in particular, in the fact that catalysts can be produced with substantially improved erosion resistance, higher chemical stability and considerably improved temperature resistance. The catalysts can be produced in module manner of construction and, with the help of combination and infiltration techniques, can be assembled to give larger units.

The exhaust gas catalysts and the processes for the production of these formed bodies are described in the following Examples:

EXAMPLE 1

A formed body according to the present invention is obtained by mixing 60% by weight silicon carbide with a grain size of from 0 to 100 μm., 10% by weight acetylene carbon, 6% by weight phenol-formaldehyde resin with a carbonisation residue of about 50% carbon in the form of a solution in acetone in the ratio of 1:5 and 24% by weight of a pre-melted metal mixture, comminuted to less than 20 μm., of 60% by weight silicon, 20% by weight molybdenum, 16% by weight vanadium and 4% by weight palladium. This mixture is homogenised, with the addition of acetone, for several hours in a mixing kneader, dried, pulverised and pressed isostatically into tubes. In a following carbonising calcination at about 800° C., the volatile components of the resin are driven off and the formed body is calcined in a vacuum sinter furnance at 2000° C. Upon cooling, the temperature is maintained constant in the region of 1850° C. for 1 hour and thereafter the furnance is allowed to cool along the natural cooling curve.

EXAMPLE 2

From a mixture of 80% by weight of hexagonal silicon carbide, consisting of equal parts of the sieve fractions 3 to 25 μm., 0 to 100 μm. and 0 to 240 μm., 10% by weight of graphite and 10% by weight of phenolic resin, with the addition of isopropanol and 10% by weight of polyvinylbutyral, there is produced a pasty batch which is cast into plates of about 3 mm. thickness. After evaporation of the solvent, they are profiled with heating and hardened by further increasing the temperature to about 100° C. In a subsequent working up process, these plates are combined to give larger modules and joined by coating the contact surfaces with a fresh batch of the mixture. The modules so produced are carbonised at about 900° C. and, in contact with a metal mixture of 70% by weight silicon and 30% by weight manganese, which has previously been melted at 1500° C. and homogenised, are infiltrated and reaction connected.

The formed bodies are subjected to an oxidation burning at about 1150° C. and thereby catalytically activated.

EXAMPLE 3

50 Parts by weight of hexagonal silicon carbide "green" with a particle distribution of from 0 to 25 μm., 10 parts by weight of graphite smaller then 5 μm., 10 parts by weight of powdered phenol-formaldehyde resin, 30 parts by weight of a metal mixture, communicated to less than 20 μm., of 75% by weight of silicon and 25% by weight of molybdenum, 15 parts by weight of polyvinylbutyral ("Butvar"), 5 parts by weight of plasticiser and 1 part by weight of separting oil are mixed with toluene and homogenised for 10 hours in a ball mill. The liquid mixture is cast into foils on a band coating plant and the foils obtained are cut up, pressed out and laminated in known manner. From these foils are produced formed bodies with flowthroughable hollow spaces and canals. The formed bodies so produced are freed from volatile components in a carbonising calcination at 800° C. and reaction bound in a vacuum sinter oven at 1950° C. The porous constructional parts obtained by this process are infiltrated in a separate infiltration process at 2050° C. with an alloy of 25% by weight of silicon and 75% by weight of molybdenum.

EXAMPLE 4

70% by weight of hexagonal silicon carbide, which consists of equal parts of granulations of 0 to 180 μm., 0 to 240 μm. and 3 to 25 μm., are mixed with 8% by weight of graphite, 5% by weight of phenol-formaldehyde resin and 17% by weight of a metal mixture, comminuted to less than 20 μm., of 80% by weight of silicon and 20% by weight of platinum, with the addition of acetone, dried, pulverised and worked up by dry pressing to give formed bodies for loose material catalysts. Alternatively, the mixture is worked up to give an extrudable mass by the addition of commercially available lubricating and binding agents and extruded to give honeycomb bodies.

Both formed body variants are carbonised and calcined and reaction bound in a non-oxidising atmosphere at 1800° C. The porous catalysts so produced are incorporated in known manner into exhaust gas flows and used for detoxication. Exhaust gas catalysts according to the present invention can, on the basis of the high mechanical and thermal stressability of the work material, be produced in the most varied forms. Thus, for example, it is possible to construct formed parts for the construction or covering of stationary or also mobile combustion chambers as exhaust gas catalysts according to the present invention so that the formed bodies simultaneously fulfil a catalyst function and other functions, for example a space bounding function.

It is thereby also possible to combine the formed bodies used as catalysts with other formed bodies which fulfil other functions, for example purely a space bounding function. In this case, formed bodies of sintered silicon carbide are especially intended which, because of the material relationship with the formed bodies produced according to the present invention, can easily be connected with these and can easily be combined with these to give a composite construction.

We claim:

1. An exhaust gas catalyst, consisting of about 50 to about 95% by weight of silicon carbide having a grain size distribution of up to about 100 μm and about 5 to about 50% by weight of an alloy of silicon with one or more metals of the group consisting of copper, iron, cobalt, nickel, chromium, vanadium, molybdenum, manganese, zinc, silver, platinum and palladium whereby this or these metals are distributed homogeneously over the whole cross-section of the catalyst.

2. A process for the production of an exhaust gas catalyst comprising;
   forming a raw body of a mixture of about 50 to about 95% by weight of silicon carbide with a grain size distribution of up to about 100 μm, about 0.5 to 20% by weight of carbon in the form of charcoal or graphite, about 0.5 to about 20% by weight of aromatic resin with a high coking residue, and about 0.5 to about 49% by weight of an alloy of silicon with one or more metals selected from the group consisting of copper, iron, cobalt, nickel, chromium, vanadium, molybdenum, manganese, zinc, silver, platinum, palladium and a mixture of silicon and one or more of said metals;
   carbonizing the resin in the body at a temperature above the decomposition temperature of the resin and in a non-oxidising atmosphere;
   subsequently subjecting the body to a reaction calcination in a non-oxidising atmosphere or in a vacuum at a temperature of from about 1350° to about 2100° C. to form a porous body; and
   cooling the porous body in a gradual manner with close control of the temperature range to demix said metal alloys.

3. The process of claim 2, further comprising infiltrating the porous body obtained after the reaction combustion or after the cooling following the reaction combustion with one or more metals of the group copper, iron, cobalt, nickel, chromium, vanadium, molybdenum, manganese, zinc, silver, platinum and palladium alone or together with silicon at a temperature of from about 1000° to about 2100° C. in a non-oxidising atmosphere or in a vacuum, and cooling the infiltrated body in a gradual manner with close control of the temperature range to demix the metal alloys.

4. The process of claim 2 wherein the raw body is formed with from about 50 to about 95% by weight of silicon carbide, about 0.5 to about 20% by weight of carbon and about 0.5 to about 20% by weight of the aromatic resin with a high carbonizing residue, the formed body is infiltrated in a non-oxidising atmosphere or in a vacuum at a temperature of from about 1350° to about 2100° C. with an alloy of silicon with one or more metals of the group copper, iron, cobalt, nickel, chromium, vanadium, molybdenum, manganese, zinc, silver, platinum and palladium and is thereby reaction bound, and is cooled in a gradual manner in the temperature region of the demixing of the metal melts to fill the pores of the porous body.

5. The process of claim 4 wherein the resin contained in the raw body is carbonised above its decomposition temperature, the formed body is siliconised with the addition of an amount of silicon necessary for the conversion of the free carbon at a temperature above about 1350° C., the porous silicon carbide formed body obtained in the siliconising process is subjected to a subsequent infiltration process with one or more metals of the group copper, iron, cobalt, nickel, chromium, vanadium, molybdenum, manganese, zinc, silver, platinum and palladium alone or together with silicon, at a temperature of from about 1000° to about 2100° C. in a non-oxidising atmosphere or in a vacuum, and cooled in a gradual manner in the temperature range of the demixing of the metal melts filling the pores.

6. The process of claim 2 wherein the raw body is formed by dry pressing, isostatic pressing, extruding, injection moulding, paste casting or foil casting.

7. The process of claim 2 further comprising a chemical after-treatment to the catalyst with an acid, lye or salt to activate the surface of the catalyst.

8. The exhaust gas catalyst of claim 1 wherein the catalytic surface thereof has been activated by oxidation.

9. The exhaust gas catalyst of claim 1 wherein the catalytic surface thereof has been activated by chemical treatment with acid, lye or salt.

10. The process of claim 2 further comprising activating the surface of the catalyst by oxidation.

11. The process of claim 2 further comprising activating the surface of the catalyst by chemical treatment with acid, lye or salt.

12. The process of claim 1 wherein, in the cooling step, the temperature is first maintained for 1 hour at a level of about 150° C. lower than the calcination temperature, and then the porous body is permitted to cool further in the non-oxidising atmosphere or vacuum without removal therefrom.

* * * * *

UNITED STATES PATENT AND TRADEMARK OFFICE
CERTIFICATE OF CORRECTION

PATENT NO. : 4,812,434

DATED : March 14, 1989

INVENTOR(S) : Hans-Jurgen Pohlmann, et al.

It is certified that error appears in the above-identified patent and that said Letters Patent is hereby corrected as shown below:

Col. 1, line 13    "iron cobalt" should read "iron, cobalt".

Col. 1, line 26    "agent" should read "agents".

Col. 2, line 20    "17 15 993" should read "15 17 993".

Col. 4, line 31    "or the catalyst" should read "of the catalyst".

Col. 5, line 40-41    "communicated" should read "comminuted".

Col. 5, lines 44    "separting" should read "separating".

UNITED STATES PATENT AND TRADEMARK OFFICE
CERTIFICATE OF CORRECTION

PATENT NO. : 4,812,434

DATED : March 14, 1989

INVENTOR(S) : Hans-Jurgen Pohlmann, et al.

It is certified that error appears in the above-identified patent and that said Letters Patent is hereby corrected as shown below:

Column 8, line 22, "claim 1 wherein" should read

-- claim 2 wherein --.

Signed and Sealed this

Sixteenth Day of January, 1990

*Attest:*

JEFFREY M. SAMUELS

*Attesting Officer*    *Acting Commissioner of Patents and Trademarks*